United States Patent [19]

Grimm et al.

[11] Patent Number: 5,076,172

[45] Date of Patent: Dec. 31, 1991

[54] RETURNING SYSTEM FOR RAIL-BOUND TRANSPORT CARTS WITHOUT INTERNAL DRIVE

[75] Inventors: Erwin Grimm; Christian Koch; Volker Häusler; Helmut Pfenning; Hubert Christ, all of Mainz, Fed. Rep. of Germany

[73] Assignee: Schott Glaswerke, Mainz, Fed. Rep. of Germany

[21] Appl. No.: 668,312

[22] Filed: Mar. 11, 1991

Related U.S. Application Data

[63] Continuation of Ser. No. 569,295, Aug. 17, 1990, abandoned, which is a continuation of Ser. No. 164,950, Mar. 7, 1988, abandoned.

[30] Foreign Application Priority Data

Mar. 7, 1987 [DE] Fed. Rep. of Germany ....... 3707395
Feb. 13, 1988 [DE] Fed. Rep. of Germany ....... 3804593

[51] Int. Cl.⁵ .............................................. B61B 13/12
[52] U.S. Cl. .................................. 104/166; 104/172.1
[58] Field of Search ................... 104/89, 91, 94, 165, 104/166, 167, 168, 172.1, 172.2, 172.3, 172.4; 198/465.1, 334, 792

[56] References Cited

U.S. PATENT DOCUMENTS

| 1,263,043 | 4/1918 | Curtis, Jr. ................. | 104/172.2 |
| 3,811,385 | 5/1974 | Johnson et al. ........... | 104/167 |
| 3,842,961 | 10/1974 | Burson ..................... | 104/167 X |
| 3,866,537 | 2/1975 | Minkowitz ................ | 104/166 X |
| 3,934,701 | 1/1976 | Mooney et al. ........... | 104/167 X |
| 4,461,216 | 7/1984 | Carney ..................... | 104/172.4 X |
| 4,498,397 | 2/1985 | Fuchs et al. .............. | 104/35 |

FOREIGN PATENT DOCUMENTS

| 560249 | 4/1957 | Italy ........................... | 104/167 |
| 1056913 | 2/1967 | United Kingdom . | |
| 1256879 | 12/1971 | United Kingdom . | |
| 1265607 | 3/1972 | United Kingdom . | |

Primary Examiner—Margaret A. Focarino
Assistant Examiner—Joseph D. Pape
Attorney, Agent, or Firm—Millen, White & Zelano

[57] ABSTRACT

Transport carts without internal drive which are bound to rails are moved in a returning system on a transport line from a common main drive. In the end area of the transport line, a secondary drive system is provided so that the transport carts are transferrable along a vertical curve into an inverted position onto a return line which is disposed parallel beneath the transport line and is provided with a second main drive system.

22 Claims, 5 Drawing Sheets

RETURNING SYSTEM FOR RAIL-BOUND TRANSPORT CARTS WITHOUT INTERNAL DRIVE

This application is a continuation of application Ser. No. 07/569,245, filed Aug. 17, 1990, now abandoned, which is a continuation of application Ser. No. 07/164,950, filed Mar. 7, 1988, now abandoned.

The invention relates to a returning system for rail-bound transport carts without internal drive, which are moved on a transport line by a common main drive system.

Such transport carts are employed to transport workpieces which are loaded at certain points of the transport line and de-loaded at other definite points. In any case, the transport cart should be returned somehow to a starting point.

From the German patent letter 26 38 312, it is known to return the transport carts in one and the same level along a parallel-extending rail-line with the interposition of double turntables for maintaining the sense of movement of the transport carts.

In the German disclosure letter 30 46 175, it is described that the transport carts are returned to the starting point in one and the same level with the use of curved rail portions and corresponding drive elements.

A further possibility consists in that the transport carts are returned to the starting point with the interposition of so-called lower/lift-stations via a return line disposed spacedly beneath the main transport line; in this case, the possibility that a transport cart in the transport line is stopped in response to a contact with a halting preceding cart, as described in the German patent letter 26 38 312, is inverted, due to the change of the sense of movement of the transport carts, into a possible blocking of a returning transport cart by a subsequent transport cart.

These known devices for returning transport carts, however, have the disadvantage that expensive mechanical devices with a large space demand are necessary. Moreover, only a discontinuous returning is possible with those devices.

Therefore, it is the object of the invention to provide a returning system which does not require expensive mechanical devices for the steering of the transport carts, which requires only a minimum of space, which makes possible a continuous returning of transport carts, and which automatically brings the transport carts during their return into an inverted position for purposes of cleaning.

According to the invention, that object is attained by providing a secondary drive system in an end area of the transport line in a manner so that the transport carts are transferrable via a vertical curve into an inverted position on a return line which is disposed parallel with and beneath the transport line and is provided with a second main drive system.

The secondary drive system preferably comprises circulating drive means which may be a tow chain or a slotted-link or rope drive. This drive means is deflected when arriving from below in the end area of the transport line so that it is guided parallel with and appropriately between the rails.

The transport carts preferably comprise at the underside thereof a clutch which advantageously is formed as a latch. This latch which preferable consists of a lever arm and a follower nose is pivotable at its one end about a horizontal axis and comprises at its other end a support roller which can rolls on an additional rail disposed parallel to the rails of the transport and the return line. If a transport cart arrives in the end area of the transport line, the support roller comes free from the additional rail which ends in this area whereby the latch which advantageously is under a spring bias moves away downwardly from the bottom of the transport cart and can engage with its follower nose into the drive means of the secondary drive system. That drive means has a higher speed than the arriving transport carts and thus takes over the further transport of the transport carts from the main drive, with the transport carts being subsequently guided along a guided along a vertical curve downwardly where they arrive in an inverted position.

At least in the area of that vertical curve, the support rollers of the transport carts run in double rails. Preliminarily, the support of the transport carts is substantially effected by the inner rails of these double rail, which are in connection with the rails of the transport line. The more the transport carts are transferred downwards, the more will the rollers be supported by the outer rails of the double rails which finally merge into the rails of the return line in a starting area of the return line.

In that starting area of the return line, the drive is taken over by a second main drive system, and in doing so, the roller of the latch again comes to roll on one of the additional rails, thus effecting a de-coupling of the latch from the drive means of the secondary drive system which drive means thereafter is deflected upwards.

The transport carts are returned in their inverted position.

By the returning system according to the invention, it is possible, to get by with a small space demand and to continuously return the transport carts to the starting point where an identical secondary drive system will return the carts again upwardly to the transport line where the carts are transferred again from the inverted into the normal position. The transport carts are automatically cleaned by the inversion thereof.

The returning system according to the invention may be employed with any kind of transport cart and with the most different kinds of main drive systems.

The invention will be subsequently described at more detail by means of embodiment examples in connection with the drawings.

Figure 1:
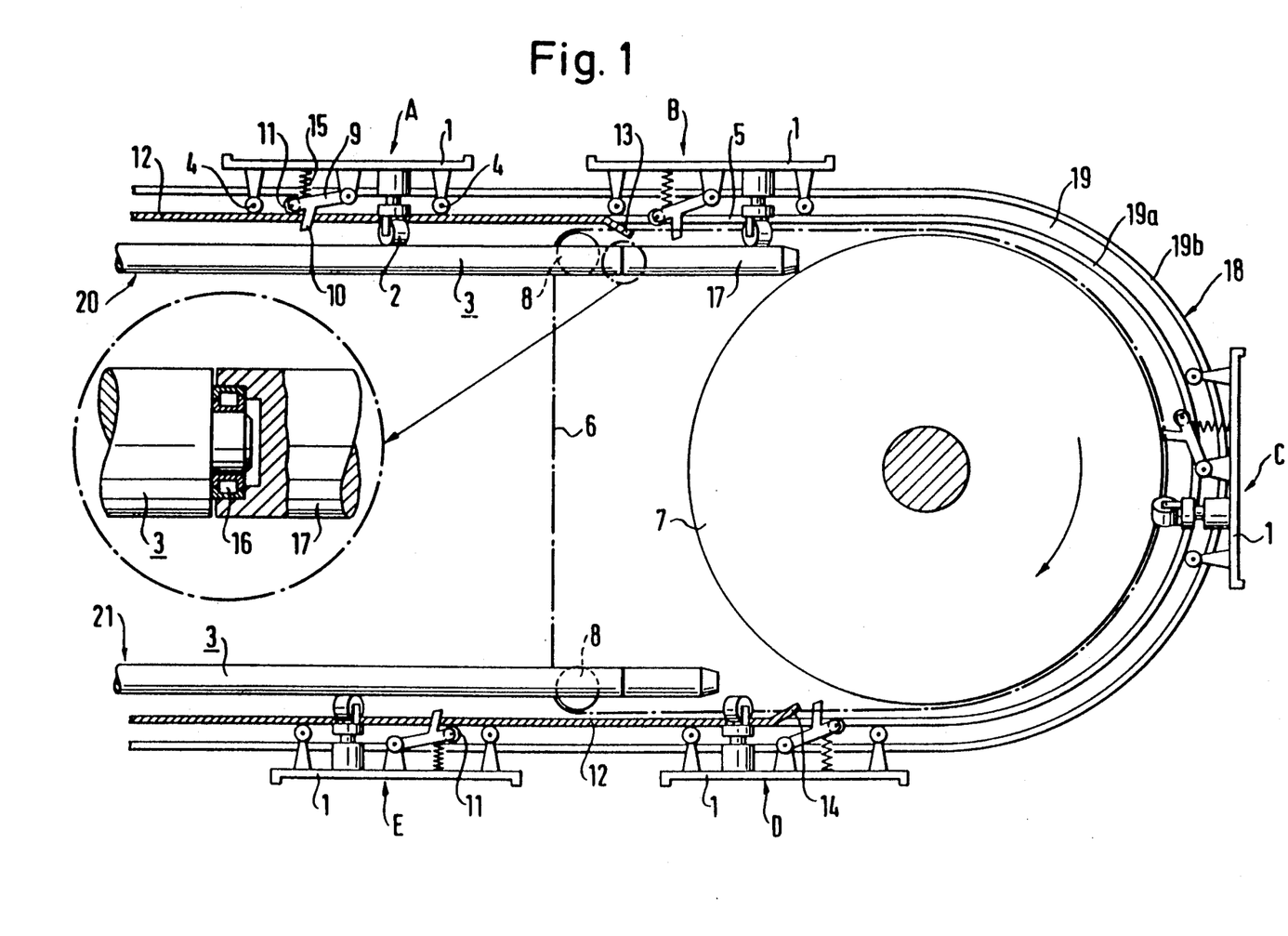
FIG. 1 illustrates diagrammatically, of an embodiment, a lateral view of the end area of the transport line 20 and the starting area of the return line 21 arranged therebelow, as well as the interpositioned secondary drive system.

According to FIG. 1, a transport cart is provided with support rollers 4 running on a rail 5. The transport cart 1 comprises at its underside a first drive means or drive wheel 2 which is pivotable about a vertical axis and driven by a horizontal shaft 3 having a smooth cylindrical surface extending parallel to the rail 5. The shaft 3 serves as a main drive system. A secondary drive system which for instance may be a flexible member in the form of a tow chain 6 is continuously driven by a drive wheel 7 and is guided via two deflecting wheels 8 to be parallel, in a defined area between these deflecting wheels 8 and the drive wheel 7, to the shaft 3 of the transport line 20 and a corresponding shaft 3 of a return line 21. The speed of the tow chain 6 is slightly greater than the speed of the transport cart 1 resulting from the rotational speed of the shaft 3 of the transport line and the position of the drive wheel 2. The transport cart 1 comprises additionally at its underside a latch 9 having a follower nose 10, which provides a second drive means. The latch 9 is at its one end supported at the transport cart and is provided at its other end which a support roller 11 which rolls on an additional rail 12 disposed parallel to the rail 5. The additional rail 12 is interrupted from a point 13 at the end of the transport line or transport track 20 via a vertical curve 18 until a point 14 at the beginning of the return line, whereby the support roller 11 will come free of the additional rail 12, and the latch 9 with its follower nose 10 can engage into the chain 6, aided by a spring 15.

The following sequence will take place during the tranfer of a transport cart from the upper transport line into the lower return line:

The transport cart 1 is moved via the shaft 3 and the drive wheel 2 towards the end area of the transport line 20. The latch 9 is held in its upper position by the support roller 11 which is supported on the additional rail 12 against the force of the spring 15. If the transport cart 1 arrives in the area of the secondary drive system (position B), where the additional rail 12 is interrupted, the latch 9 engages with its follower nose 10 into the tow chain 6. Additionally, the transport cart 1 is driven by the secondary drive system which has a slightly higher speed. In this phase of the sequence, the drive wheel 2 is on a shaft portion 17 which is connected by means of a one way clutch 16 with the driven shaft 3. The speed differential between main and secondary drive system is equalized by this one way clutch 16 in that the transport cart 1 when it is entrained by the secondary drive systems faster than by the main drive system will retroactively entrain, by means of its drive wheel 2, the shaft portion 17 to a speed which is higher than that of the shaft 3. When continuing the sequence, the drive wheel 2 will reach the end of the shaft portion 17 which is shaped conically. The transport cart 1 then disengages from the main drive system and is guided by means of the chain 6 along the vertical curve or transfer track 18 (position C). At least in the area of the vertical curve or transfer track 18, the rails are designed as double rails 19 comprising inner rails 19a and outer rails 19b, the distance between which is slightly greater than the diameter of the support wheel 4. At the end of the vertical curve 18, the transport cart 1 (position D) is gradually transferred into the horizontal return line 21; firstly, the drive wheel 2 arrives at a conical end of the lower drive shaft 3 of the main drive system of the return line 21, which will additionally entrain the transport cart 1 in the return line or return track with a speed corresponding to the speed of the chain 6. Subsequently, the support roller 11 reaches the additional rail 12 at point 14; the follower nose 10 disengages from the chain 6 and the main drive system of the return line 21 takes over solely the drive of the transport cart 1.

Figure 5:
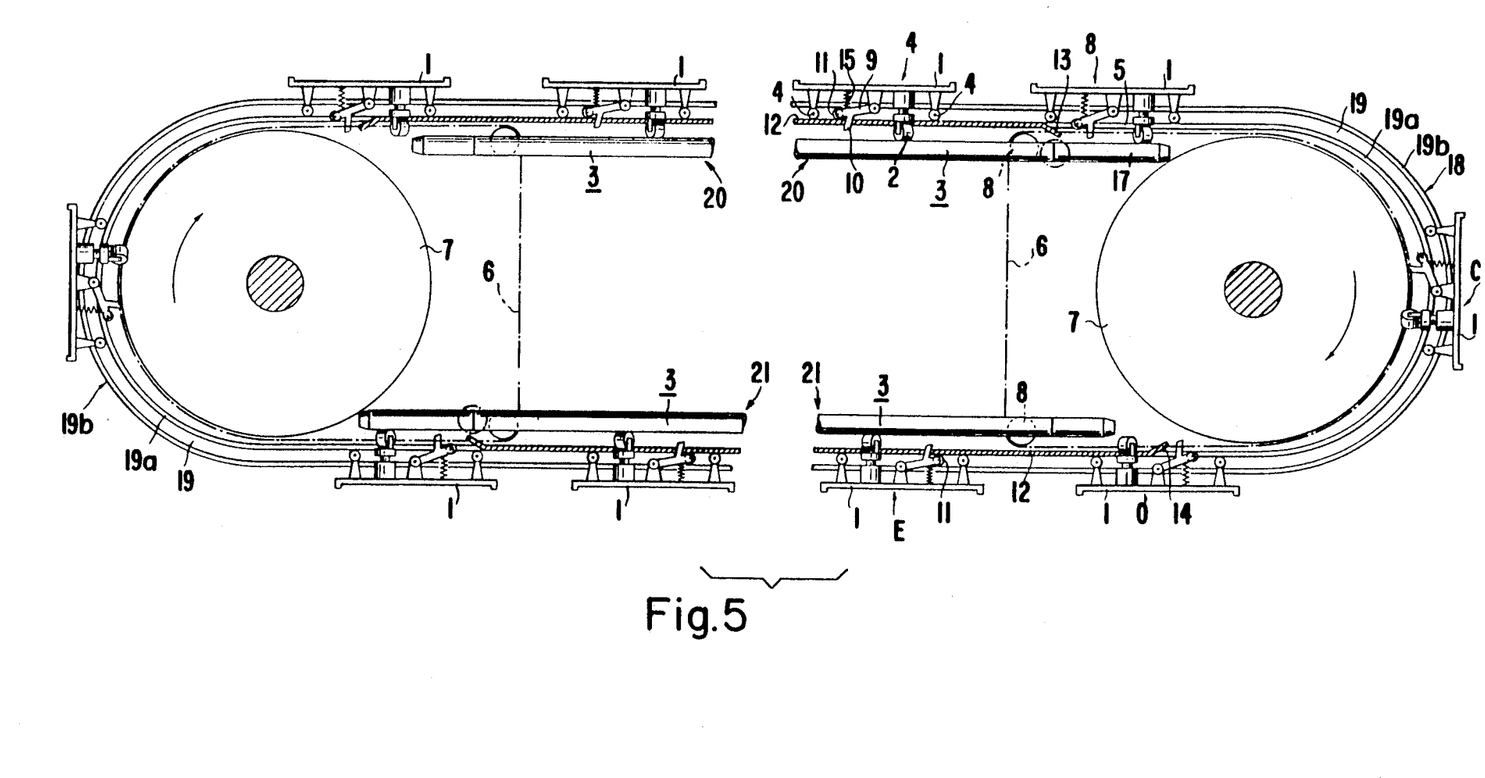
FIG. 5 illustrates diagrammatically the complete system of FIG. 1, wherein a secondary drive system is incorporated so that the carts 1 move cyclically around the system.

As is seen in FIG. 5, the transfer of the transport cart from the lower return line 21 into the upper transport line 20 is effected according to the same principle.

The transport track 20, return track 21 and transfer track 18 have spaced apart rails which cooperate to define means for orienting the transport cars in an upright position when on the transport track and in an inverted position when on the return track.

Figure 2:
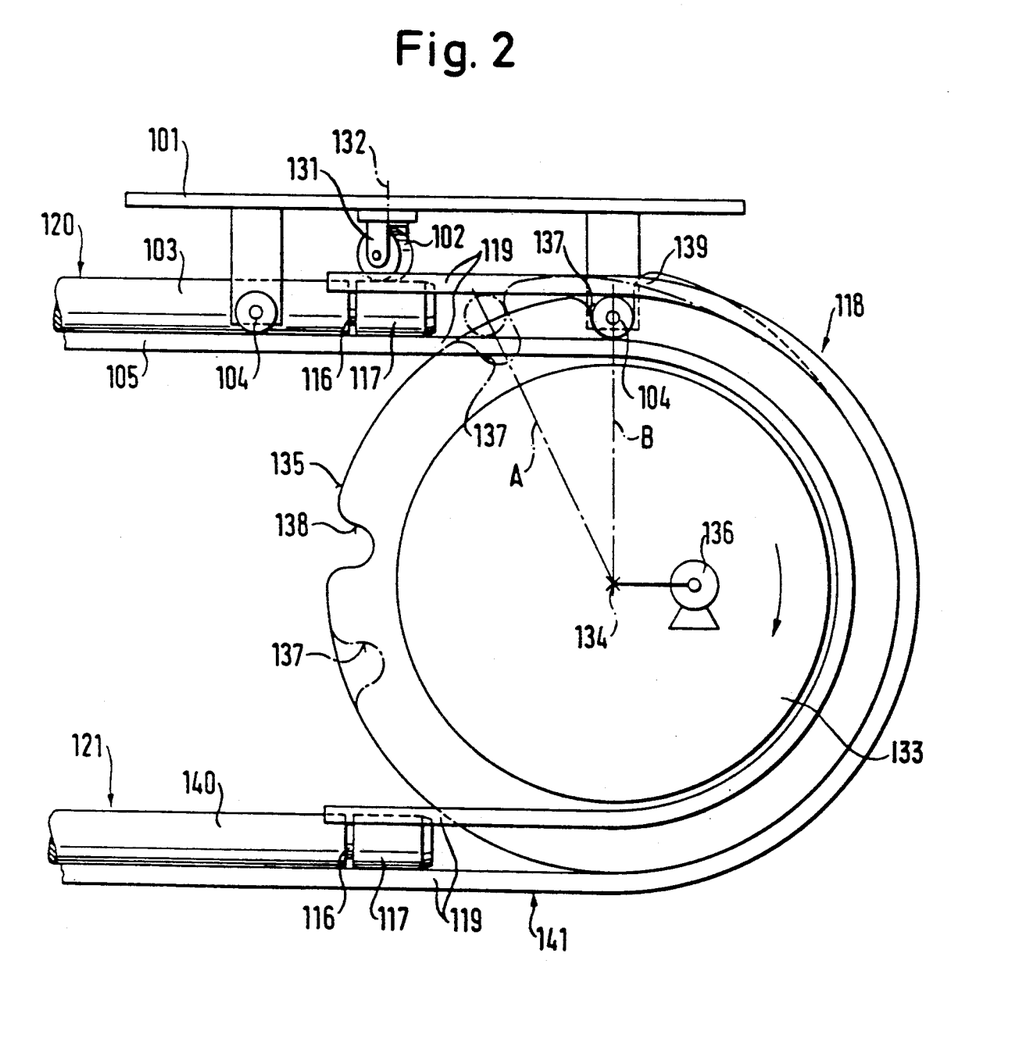
FIG. 2 is a diagrammatical partial view of the nature of a lateral view and illustrates another embodiment of the secondary drive system.
Figure 3:
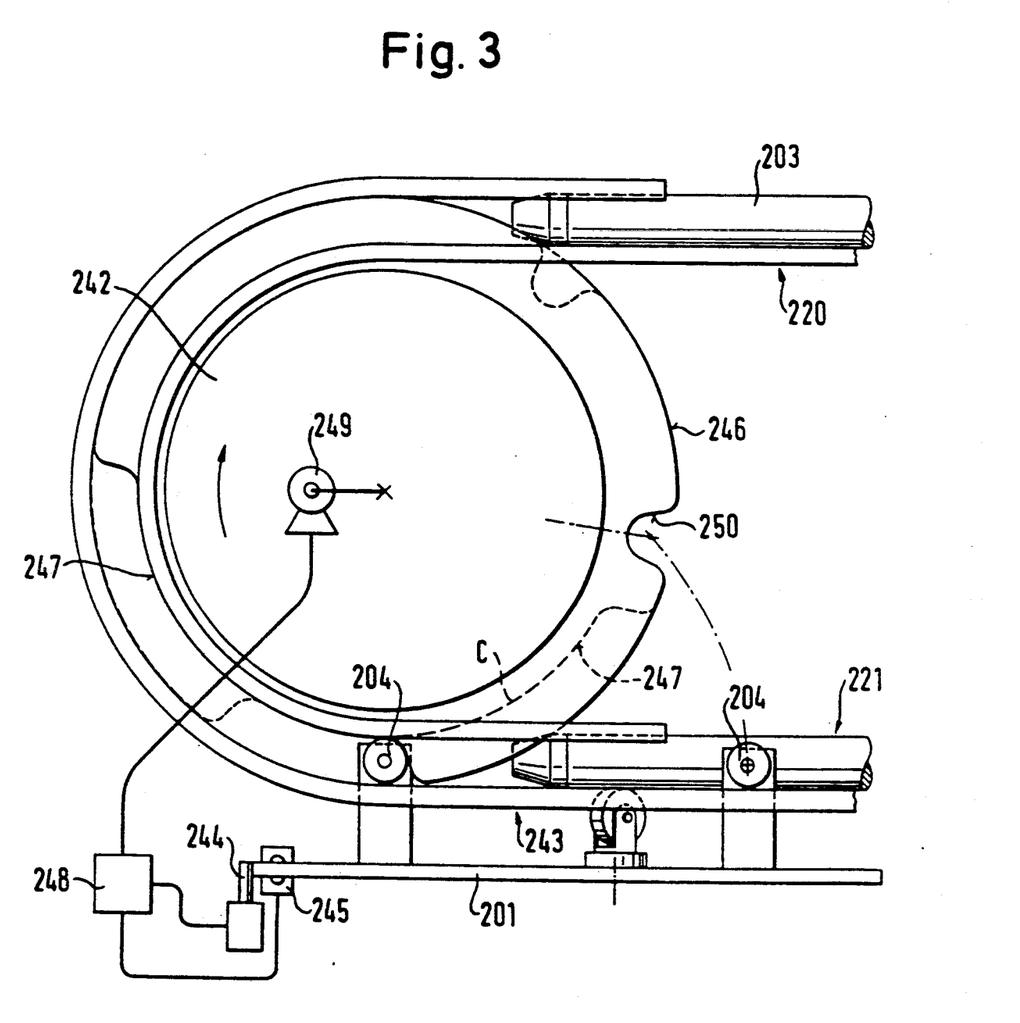
FIG. 3 is an illustration corresponding to FIG. 2 of the other end of a returning system and shows a further embodiment of a secondary drive system.
Figure 4:
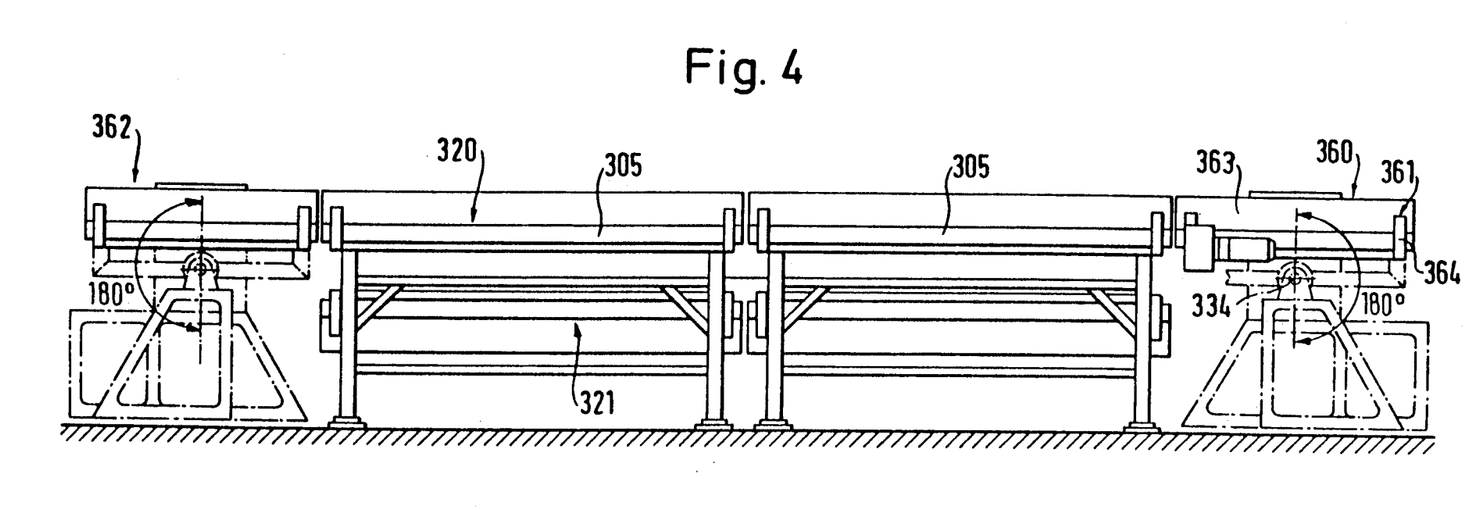
FIG. 4 is diagrammatic side view of a returning system with a further embodiment of a secondary drive system.

The embodiments according to FIGS. 2 to 4 are advantageous in that they are structurally simple, safe in operation, and rugged. Particularly, they have the advantage that structural parts which require a relatively high maintenance expense, as for instance a chain, are not used. Therefore, these returning systems are particularly suitable for operation under severe conditions, particularly at high temperatures and/or in an aggressive or abrasive atmosphere.

The returning system illustrated in FIG. 2 serves to transfer transport carts 101 without internal drive from a transport line 120 on which in a normal case, a plurality of transport carts are spacedly advanced by a common main drive system, via a vertical curve 118 into a return line 121 which is essentially disposed parallel beneath the transport line 120. In the illustrated embodiment, the transport carts 101 have forward and rear support rollers 104 which are supported on a rail 105. The main drive system comprises as an essential part a shaft 103 extending along the rail 105. The transport cart 101 contains a drive wheel 102 which is frictionally driven by the shaft 103 and has its axis disposed obliquely with respect to the shaft whereby a force component in the desired transport direction is generated. The shaft 103 has, at its end adjacent to the vertical curve 118, an end portion 117 which is coupled with the main portion of the shaft 103 via a one way clutch 116. Along the vertical curve 118, the transport cart 101 is advanced by a secondary drive system, with the support rollers 104 being guided between double rails 119. The secondary drive system comprises a secondary drive wheel 133 which is rotatable and drivable about an essentially horizontal axis of rotation 134. The vertical curve 118 extends along a portion of the circumference of the secondary drive wheel 133.

The secondary drive wheel 133 has a circumferential contour which is designed so that in a predetermined starting rotational position A which is illustrated in FIG. 1 in dot-hatched-lines, the transport cart 101 can drivingly engage the contour, in the illustrated case with its forward support wheels 104, and turn the secondary drive wheel 133 into a transport start position B which is illustrated in FIG. 2 in full lines. The circumferential contour 135 furthermore is designed so that the transport cart 101 on its way into the transport start position B will be coupled into the circumferential contour 135 to be driven further by the secondary drive wheel 133, and will remain in this engaged position until it is transferred into the return line 121. A wheel drive device 136 is provided which turns the secondary drive wheel 133 from the transport start position B into the starting rotational position A, and this with a rotational speed so that the transfer time from the transport line 120 into the return line 121 is shorter than the mean time distance between subsequent transport carts 101. In this connection, it is not disturbing if a congestion of transport carts 101 will form temporarily in front of the transfer area. In order to avoid a congestion completely, the transfer time preferably is shorter than the shortest time distance between two transport carts.

The end portion 117 of the shaft 103 extends sufficiently into the transfer area to drive the secondary drive wheel 133 by means of the transport cart 101 engaged therewith into the transport start position B; then, the wheel drive device 136 will then be switched on. It will be appreciated that corresponding sensors for sensing the respective positions of the secondary drive wheel 133 are provided to control the rotational movement of the wheel 133.

In the illustrated embodiment, the one-way-clutch 116 has the effect that the driving actions of the main drive system, i.e. the shaft 103 and the wheel drive device 136, may overlap without the occurrence of undue wear.

In the illustrated embodiment, the transport cart 101 is engaged with its support wheel 104 into the circumferential contour 135 of the secondary drive wheel 133. This offers the advantage that mechanical tensions are avoided in the transfer area. With the same advantage, also separate coupling wheels may be used which are coaxial with the support wheels. Since the transport cart 101 has forward and rear support wheels, the circumferential contour 135 has two excavations 137, 138 therefor. In the illustrated embodiment, the forward excavation 137 has a slightly radially projecting front wall 139 in order that the secondary drive wheel 133 can be safely entrainingly engaged by the forward support wheels 104 of the transport cart 101. In general, however, such a radial projection of the excavation front wall is not necessary.

In the return line 121, the main drive system comprises a shaft 140 which acts like the shaft 103, whereby a transport cart 101 which has been conveyed by the secondary drive wheel 131 downwardly and has reached a lower transfer area 141 (exit rotational position of the secondary drive wheel 133) will be drawn by the shaft 140 into the return line 121. In order that this operation will take place undisturbedly, the portions of the circumferential contour 135 of the secondary drive wheel 133 which come into engagement with the support wheels 104 of the transport cart 101 are radiused. Then, the transport speed can be smaller in the return line 121 than along the vertical curve 118, and particularly of the same magnitude as in the transport line 120.

The transport line 120 and the return line 121 can be interconnected at their other ends not illustrated in FIG. 1, via a second secondary drive wheel which is designed and operates like the described secondary drive wheel 133.

FIG. 3 shows in another embodiment the (with respect to FIG. 2) other end of the returning system with a second secondary drive wheel 242 which interconnects the end of the return line 221 with the beginning of the transport line 220.

The second secondary drive wheel 242 may be identical with the first secondary drive wheel and may be controlled in a corresponding manner. FIG. 3 shows an embodiment in which the secondary drive wheel 242 does not act itself as a sensor.

An end area 243 of the return line 221 contains a movable end abutment 244 and an electro-optical sensor 245. Preliminarily, the second secondary drive wheel 242 is in a starting position C illustrated in hatched lines, in which an excavation 247 provided in a circumferential contour 246 of the secondary drive wheel 242 leaves space for the introduction of a transport cart 201 into the end area 243. As soon as, illustrated, a transport cart 201 has entered the end area 243, and its position has been sensed by the sensor 245, a control device 248 causes that a drive device 249 rotates the secondary drive wheel 242 through the illustrated intermediate position in which a part of the transport cart 201 is engaged at the end of the excavation 247, into a non-illustrated rotational transfer position in which the transport cart 201 has been put on the beginning of the transport line 220 and will be entrained further from the main drive system provided there, which again operates with a shaft 203. In the illustrated embodiment, the forward support wheels of the transport cart 201 are engaged, and the rear support wheels are received in a radiused excavation 250 provided to this end in the secondary drive wheel 242.

The illustrated second secondary drive wheel 242 may stop for a short time in the transfer position to ensure a transfer without disturbance or it may be returned again into the starting rotational position A without a stop if the second circumferential contour is suitably formed with radiused edges, as illustrated.

Preferably, this is effected in each transfer area automatically so that a fully automatic operation is achived. If the main drive system operates with a frictional drive, as illustrated, transient speed differentials between driving and driven parts are not objectionable. However, is also possible to provide for a transition substantially free of friction by correspondingly controlling the rotational speed of the secondary drive wheel. Moreover, the transitions are equalized in the illustrated embodiment in that the shafts of the main drive system have end portions which are each connected with the remainder of the shaft via a one way clutch; this has been described in connection with FIG. 2.

FIG. 4 illustrates another embodiment of a returning system for non-illustrated transport carts without internal drive which are bound to rails 305 and are moved on a transport line 320 by a common main drive system. In the end area of the transport line 320, a secondary drive system is provided so that the transport carts are transferrable via a vertical curve, which in this case is not embodied in structural parts, into an inverted position on a return line 321 which is disposed parallel with and beneath the transport line 320 and is provided with a second main drive system.

The secondary drive system contains a transport cart support 360 which is rotatable and drivable about a horizontal axis of rotation 334. The support 360 is aligned in a first rotational position, as illustrated, with an end of the transport line 320 and in a second rotational position rotated relative thereto by 180° to an adjacent end of the return line 321 and comprises selectively actuatable fastening means 361 for fastening the transport cart in the support 360.

A second, identical returning system with a pivotable support 362 is provided at the other ends of the transport line 320 and the return line 321. The aforedescribed embodiment according to FIG. 4 offers the advantage of great structural simplicity and safety of operation. The control can be easily effected automatically. The obtainable transfer velocities, however are smaller than with the embodiment according to FIGS. 2 and 3, because of the reciprocating masses.

In order to avoid a congestion of transport carts which, however, can be readily controlled mechanically if only the transfer time is shorter than the mean time distance between two transport carts, it is advantageous that the transfer time is smaller than the smallest time distance between two subsequent transport carts in the transport line.

To make sure that the transport carts enter the support 360 completely, it is appropriate that in both rotational positions of the support 360, a transport cart being therein is in driving connection with the first or the second main drive system, respectively. This can be effected particularly easily with the above-described main drive system operating with a frictional drive.

In the embodiment according to FIG. 4, the transport cart support 360 comprises a receiving channel 363 into which, in the first rotational position, a transport cart may enter and from which, in the second rotational position, a transport cart may exit. The fastening means 361 comprises a movable stop 364 which prevents that a transport cart being in the support 360 drops out therefrom, and which is releasable in the second, lower rotational position. In this way, a safe and fully automatic operation can be obtained with extremely simple means.

We claim:

1. A returning system comprising:
a plurality of separate, continuously disconnected and spaced apart rail-bound transport cars, each having at least a pair of support rollers spaced from one another on separate axes without internal drives, which are moved on a transport line by a common main drive system, wherein a separate independent secondary drive system is provided in an end area of the transport line to transfer the transport cars via a vertical curve to a return line extending substantially parallel with and beneath the transport line and having a starting area adjacent the secondary drive system, the secondary drive system including means (7) for moving the transport cars at a velocity greater than the velocity imparted thereto by the main drive system, the return line being provided with a second main drive system, the second main drive system including means for transferring the transport carts (1) on the return line (21) in an inverted position; the secondary drive system comprising a circulating drive means (6) which is guided parallel to rails (5) of the transport line over a substantial portion of the rails and the return line in the end area of the transport line (2) and in the starting area of the return line (21) respectively.

2. A returning system according to claim 1, characterized in that the circulating drive means is a tow chain (6).

3. A returning system according to claim 1, wherein the vertical curve (8) comprises at least, two double rails comprising inner rails (19a) and outer rails (19b), the distance between the inner and outer rails being somewhat greater than the diameter of the support rollers (4) on the transport carts (1), and wherein the inner rails (19a) of the double rails (19) are connected with the rails (5) of the transport line (20) and the outer rails (19b) of the double rails (19) are connected with the rails (5) of the return line (21).

4. A returning system according to claim 1, wherein the transport carts (1) comprise at the underside thereof a latch in which in the end area of the transport line (20) engages automatically into the drive means of the secondary drive system and comes automatically out of engagement with the drive means in the starting area of the return line (21).

5. A returning system according to claim 4, wherein the clutch is configured as a latch (9) which is provided with a follower nose (10) and a support roller (11) guided on an additional rail (12) which additional guide rail is interrupted in the area of the secondary drive system wherein the follower nose (10) projects into the drive means of the secondary drive system.

6. A returning system according to claim 1, wherein a further secondary drive system is provided between the end area of the return line (21) and a starting area of the transport line (20) so that the transport carts (1) are again transferrable from the inverted into their normal positions.

7. A returning system according to claim 1, characterized in that the secondary drive system comprises a secondary drive wheel (133) which is rotatable and drivable about a horizontal axis of rotation (134) and which engages a transport cart (101) being in an end area of the transport line (120) and to transfer it along the vertical curve (118) extending along a circumferential portion of the secondary drive wheel (133) into the return line (121).

8. A returning system according to claim 7, characterized in that the end of the return line (121) is connected with the beginning of the transport line (220) via a further secondary drive wheel (242).

9. A returning system according to claim 7, characterized in that the secondary drive wheel (133; 242) comprises a circumferential contour which engages at least a part of the transport cart (101; 201).

10. A returning system according to claim 9, characterized in that a circumferential contour (135; 246) is provided which engages with the supporting wheels (104; 204) of the transport cart (101; 201).

11. A returning system according to claim 7, characterized in that the transfer time is smaller than the smallest time distance between two subsequent transport carts in the transport line.

12. A returning system according to claim 7, characterized in that the secondary drive wheel (133; 242) is automatically rotatable after each transfer operation into a starting rotational position in which a transport cart can enter the end area of the transport line, and that a sensing device is provided which signals the presence of a transport cart in the end area of the transport line and causes a transfer operation by rotating the secondary drive wheel.

13. A returning system according to claim 12, characterized in that the secondary drive wheel (133) forms the sensing device and rotates further by a transport cart (101) entering the end area from the starting rotational position (A) into a transport start position (B) in which transport carts (101) are drivable by the secondary drive wheel (133) and a drive device (136) is actuated which effects a transfer operation by rotating the secondary drive wheel.

14. A returning system according to claim 1, characterized in that the secondary drive system comprises a transport cart support (360) which is rotatable and drivable about a horizontal axis of rotation (334), the support being aligned in a first rotational position to an end of the transport line (320) and in a second rotational position with an adjacent end of the return line (321) and comprises fastening means for a transport cart which are automatically actuatable in dependence upon the moving condition of the support.

15. A returning system according to claim 14, characterized in that a further rotatable transport cart support is provided between the end of the return line (321) and the beginning of the transport line (320).

16. A returning system according to claim 14, characterized in that in the two rotational positions, a transport cart being in the transport cart support (360) is in driving connection with the main drive system or the second main drive system, respectively.

17. A returning system according to claim 14, characterized in that the transport cart support (360) comprises a receiving channel (363) into which in the first rotational position a transport cart may enter and from which in the second rotational position a transport cart may exit, and that the fastening means comprise a movable stop (364) which prevents that a transport cart being in the support drops out therefrom during the transfer movement of the support, and which is releasable in the second rotational position.

18. A system for cycling cars around a railed track comprising:
 track means comprising a horizontal transport track and a horizontal return track joined to one another at end portions thereof by at least one vertical transfer track;
 a main drive system coextensive with the transport and return tracks;
 a secondary drive system, independent of the main drive system, the secondary drive system being disposed adjacent to the end portions of the transport and return tracks and being disposed adjacent to the transfer track, the secondary drive system including means for moving transport cars at a velocity greater than the velocity imparted thereto by the main drive system;
 a plurality of transport cars mounted on the track means for traversing the transport, return and transfer tracks, the cars being independent of one another and disconnected from one another so as to traverse the transport, return and transfer tracks in spaced relation with respect to one another, each car having at least two roller means in engagement with the track means, the two roller means comprising rollers mounted on separate axes spaced from one another, each car having a first drive means only engageable with the main drive system and a second drive means, independent of the first drive means, engageable only with the secondary drive system at the transfer track and at the portion of the transport and return tracks adjacent to the transfer track;
 the transport track, return track and transfer track cooperating to define means for orienting the transport cars when on the return track in an inverted attitude with respect to the attitude of the transport cars on the transport track.

19. The system of claim 18, wherein the means for orienting the transport cars defined by the transport, return and transfer tracks comprise inner and outer rails between which the rollers of each transport car are restrained, the rollers being spaced from one another by a distance slightly larger than the diameter of the rollers whereby the rollers roll on the inner track when rolling on the transport track and on the outer track when rolling on the return track.

20. A system for cycling cars around a railed track comprising:
 track means comprising a horizontal transport track and a horizontal return track joined to one another at end portions thereof by at least one vertical transfer track;
 a main drive system coextensive with the transport and return tracks;
 a secondary drive system, independent of the main drive system, the secondary drive system being disposed adjacent to the end portions of the transport and return tracks and being disposed adjacent to the transfer track, the secondary drive system comprising a pair of wheels with continuous flexible members looped around each wheel and disposed to run adjacent the end portions of the transport and return tracks, the continuous flexible members being engaged by the coupling means of the second drive means on each transport car for coupling the transport cars with the continuous flexible member proximate the end portion of one track and decoupling the transport cars therefrom the end portion of the other track;
 a plurality of transport cars mounted on the track means for traversing the transport, return and transfer tracks, the cars being independent of one another and disconnected from one another so as to traverse the transport, return and transfer tracks in spaced relation with respect to one another, each car having at least two roller means in engagement with the track means, the two roller means comprising rollers mounted on separate axes spaced from one another, each car having a first drive means only engageable with the main drive system and a second drive means, independent of the first drive means, the second drive means including coupling means;
 the transport track, return track and transfer track cooperating to define means for orienting the transport cars when on the return track in an inverted attitude with respect to the attitude of the transport cars on the transport track.

21. The system of claim 20, wherein the flexible member is a chain and the second drive means is a detent positively engageable with the chain.

22. The system of claim 21, wherein the secondary drive means includes means for moving the transport cars at a velocity greater than the velocity imported thereto by the main drive system.

* * * * *

UNITED STATES PATENT AND TRADEMARK OFFICE
CERTIFICATE OF CORRECTION

PATENT NO. : 5,076,172
DATED : December 31, 1991
INVENTOR(S) : Erwin GRIMM et al.

It is certified that error appears in the above-identified patent and that said Letters Patent is hereby corrected as shown below:

On the Title page, item [62]:

IN THE HEADING, UNDER RELATED US APPLICATION DATA:

Reads: - - - - - -

Continuation of Serial No. 569,295.

Should Read: - - - - - -

Continuation of Serial No. 569,245

Signed and Sealed this

Twenty-third Day of March, 1993

*Attest:*

STEPHEN G. KUNIN

*Attesting Officer*   Acting Commissioner of Patents and Trademarks